United States Patent [19]

Blalock

[11] 4,317,058
[45] Feb. 23, 1982

[54] ELECTRO-MAGNETIC RECIPROCATING ENGINE

[75] Inventor: Sherman S. Blalock, Inola, Okla.

[73] Assignees: Troy L. Cook, Broken Arrow; William C. Swisher; Mose Tiger, both of Tulsa, all of Okla.

[21] Appl. No.: 108,220

[22] Filed: Dec. 28, 1979

[51] Int. Cl.³ .............................................. H02K 33/00
[52] U.S. Cl. .................................................... 310/24
[58] Field of Search ....................... 310/23, 24, 32, 34, 310/35

[56] References Cited

U.S. PATENT DOCUMENTS

| | | | |
|---|---|---|---|
| 1,436,245 | 11/1922 | Geisler | 310/24 |
| 1,886,040 | 11/1932 | Moodyman | 310/24 |
| 1,912,441 | 6/1933 | Foust | 310/24 |
| 2,338,005 | 12/1943 | Morch | 310/24 |
| 2,639,554 | 5/1953 | Coffin | 310/24 X |
| 3,134,938 | 5/1964 | Morgan | 310/30 |
| 3,328,656 | 6/1967 | Dotson | 310/24 X |
| 3,949,249 | 4/1976 | Wiseley et al. | 310/23 X |
| 4,093,880 | 6/1978 | Teal | 310/24 |

Primary Examiner—Donovan F. Duggan
Attorney, Agent, or Firm—James H. Chafin

[57] ABSTRACT

An electro-magnetic reciprocating engine and method for converting an internal combustion engine to an electro-magnetic reciprocating engine wherein the cylinders are replaced with nonferromagnetic material and the pistons reciprocally disposed therein are replaced with permanent magnet pistons. An electro-magnet is disposed at the outer end of each cylinder. A switching and timing apparatus is operably connected between a DC electrical power source and the electro-magnets whereby the creation of a magnetic field about said electro-magnet will interact with the magnetic field about the permanent magnet pistons to effect reciprocal motion of said pistons within the cylinders. Oil rings are provided around said pistons whereby lubrication can be effected in the same manner as provided in an internal combustion engine.

9 Claims, 9 Drawing Figures

ELECTRO-MAGNETIC RECIPROCATING ENGINE

BACKGROUND OF THE INVENTION

1. Field of the Invention

The present invention relates to electro-magnetic engines and more particularly, but not by way of limitation, to an electro-magnetic reciprocating engine whereby the reciprocating pistons of said engines are permanent magnets and whereby controlled electro-magnets are provided to effect reciprocation of said pistons.

2. History of the Prior Art

Several attempts have been made to utilize permanent magnet pistons in connection with an electro-magnetic coil to provide reciprocal motion of the pistons to drive an engine.

One such device is taught in the patent to Morch, U.S. Pat. No. 2,338,005, issued in 1943. However, the modification of the motor taught in the patent to Morch includes the replacement of the cylinders with electro-magnetic windings around the cylinders so that a piston member could reciprocate within those windings. However, a problem with this teaching is that the placing of such windings within the cylinder greatly limits the size of the electro-magnet since the cylinders on an ordinary internal combustion engine are typically rather close together.

Further, such teachings would preclude the use of a water jacket to provide cooling to the cylinders due to heat created by friction between the piston and the cylinder.

SUMMARY OF THE INVENTION

The present invention provides an electro-magnetic reciprocal engine which is particularly designed to overcome the disadvantages of the prior art.

The present invention comprises an engine block for containing liquid lubricant and means for distributing that lubricant in the same manner as provided in a four-cycle internal combustion engine.

The cylinders of the present invention are constructed of a nonferromagnetic material and provided with cooling water jackets in a manner similar to that of the ordinary internal combustion engine.

The present invention, however, utilizes pistons which are either constructed of a permanent magnet or piston sleeves for carrying a permanent magnet therein. The pistons are provided with oil rings for containing the lubricant within the engine block and cylinders.

An electro-magnet is secured to the outer ends of each cylinder. These electro magnets are in the form of cylindrical coils having an axial passageway therethrough which serves as a compression relief port to eliminate pressure within the cylinder when the piston is moving outwardly and to eliminate any vacuum created by the piston moving inwardly within the cylinder.

A switching device is operably connected between the electro-magnets and a battery power source. The switching means is also operably connected to the ordinary engine timing gears for providing electrical current through the coils of the electro-magnets in a timed relationship so that the field produced by said coils will interact with the piston permanent magnet field to produce reciprocating motion of said pistons within the cylinders.

The mounting of the coils outside the cylinders or at the ends of the cylinders permits sizing of the coils to produce the necessary magnetic field strength to drive the pistons. Lubrication and cooling of the pistons is maintained in the same manner as that of an internal combustion engine.

The invention further includes a means for modifying an ordinary internal combustion engine for converting said engine into an electro-magnetic reciprocal engine embodying the present invention.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 2:
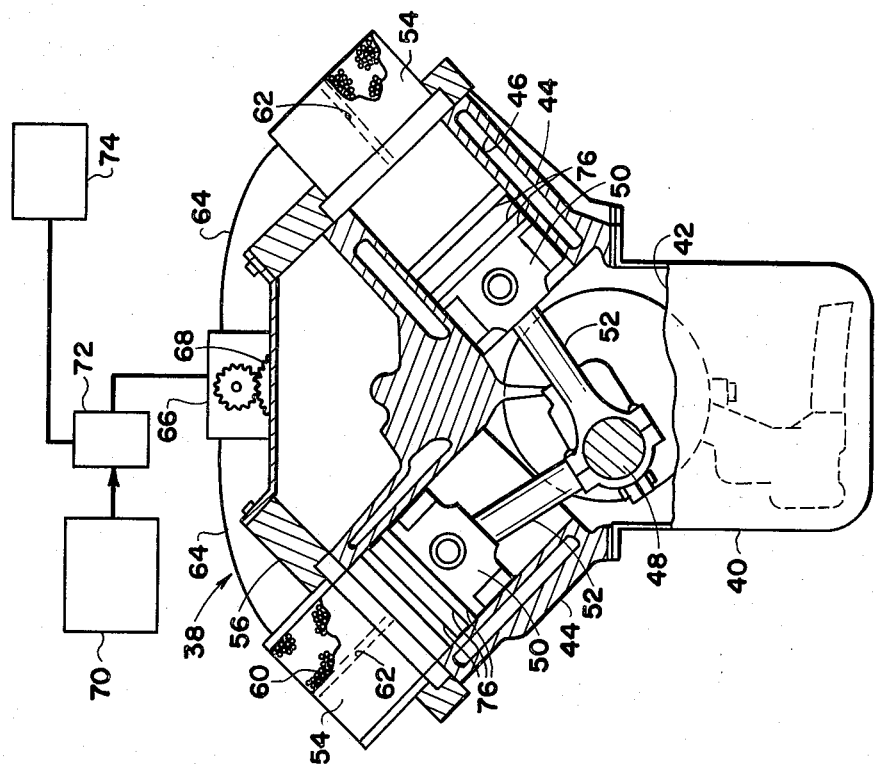
FIG. 2 is an end sectional view of an electro-magnetic reciprocating engine embodying the present invention.
Figure 1:
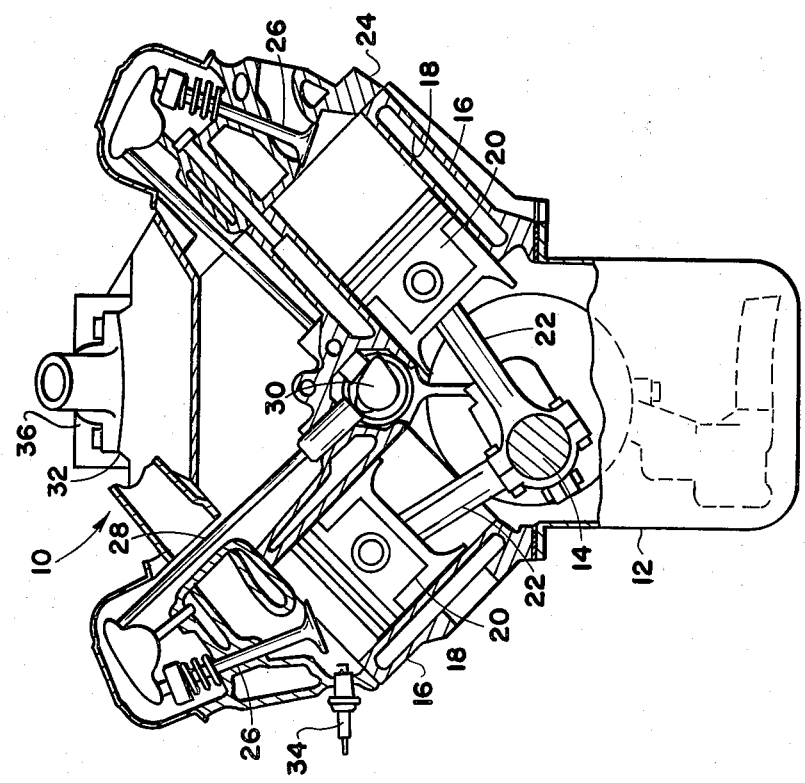
FIG. 1 is an end sectional view of an ordinary four-cycle internal combustion engine.

Referring to the drawings in detail, reference character 10 generally indicates a four-cycle internal combustion engine which generally comprises a crank case or engine block member 12, a crank shaft 14 being journalled therein. A plurality of cylinder members 16 are secured to the crank case and extend outwardly therefrom, each said cylinder 16 containing cooling water jackets 18 therein. Reciprocating piston members 20 are disposed within the cylinders 16 and are secured to the crank shaft 14 by means of connecting rods 22.

Secured to the outer ends of the cylinder 16 are head members 24 which contain reciprocating valve members 26 therein, said valve members being operated by appropriate valve lifters and rods 28 which are moved and timed by means of a cam shaft 30 which is operably connected to the crank shaft 14 for rotation. A gasoline intake manifold 32 is secured to the top of the engine for acceptance of a suitable carburetor (not shown). Firing in the cylinders is accomplished by spark plugs 34 and a distributor timing mechanism 36.

Referring now to FIG. 2, reference character 38 generally indicates an electro-magnetic reciprocating engine comprising an engine block 40 which is similar to or substantially identical to the engine block 12 for containing liquid lubricant 42 therein. A plurality of cylinders 44 are secured to the engine block and are made of a nonferromagnetic material. Contained within the cylinder members 44 are suitable cooling water jackets 46.

Journalled within the engine block 40 is a suitable crank shaft 48 which is substantially identical to the crank shaft 14 of the engine 10.

A plurality of permanent magnet pistons 50 are reciprocally disposed within the cylinders 44 and are operably connected to the crank shaft 48 by suitable piston rods 52.

It is noted that the piston members 50 may be made of a ferromagnetic material in the form of a permanent magnet, the poles of said magnet being in longitudinal alignment with the cylinders 44. A plurality of oil rings 76 are provided around the outer periphery of each piston 50.

An electro-magnet 54 is secured to the outer end of each cylinder 44 by means of head plate members 56 which are also made of a nonferromagnetic material. The electro-magnets 54 are provided with wire coils 60 and each electro-magnet 44 is provided with a longitudinal passageway 62 therethrough which is in communication with the inside of the cylinder 44.

The electro-magnets 54 and the coil 60 thereof are electrical connected by suitable wires 64 to a switching mechanism 66 which in turn is connected to a timing gear 68. It is noted that the timing gear 68 may be simply the timing gear and shaft typically associated with the distributor of an internal combustion engine. The switching member 66 is in turn electrically connected to a DC power source 70 through a variable rheostat 72. Control of the rheostat 72 is provided by a suitable operator's control member 74 which may be an accelerator pedal, lever arm or the like.

Figure 5:
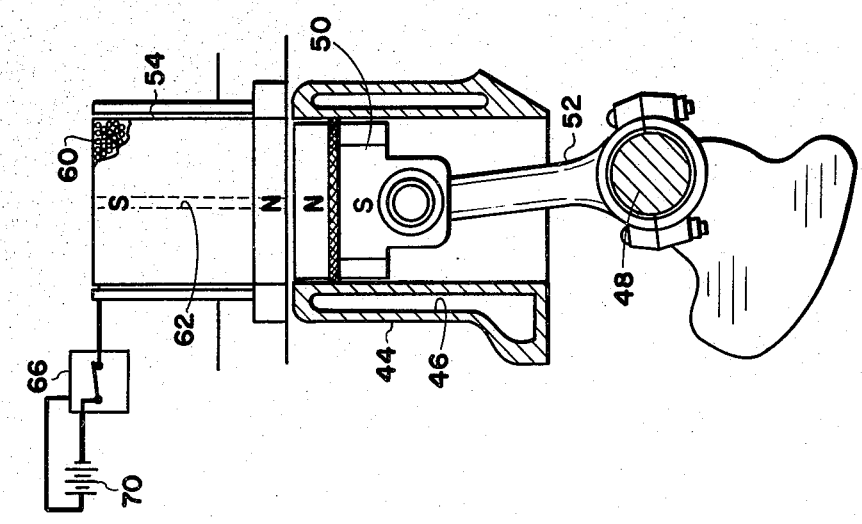
FIGS. 5 through 7 are sectional views of a piston and cylinder showing the piston in three different stroke positions.

In operation, the electro-magnetic engine 38 is lubricated in the manner provided by an ordinary internal combustion engine. However, the pistons 50 are driven by opposing magnetic fields as depicted in the piston diagrams of FIGS. 5, 6 and 7. FIG. 5 depicts the piston 50 after it has just passed top dead center of its stroke within the cylinder 44.

Figure 6:
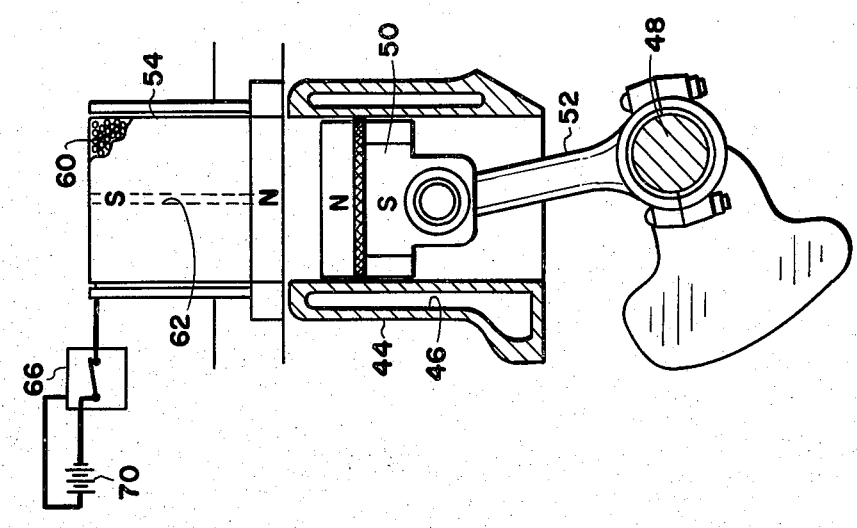
Figure 7:
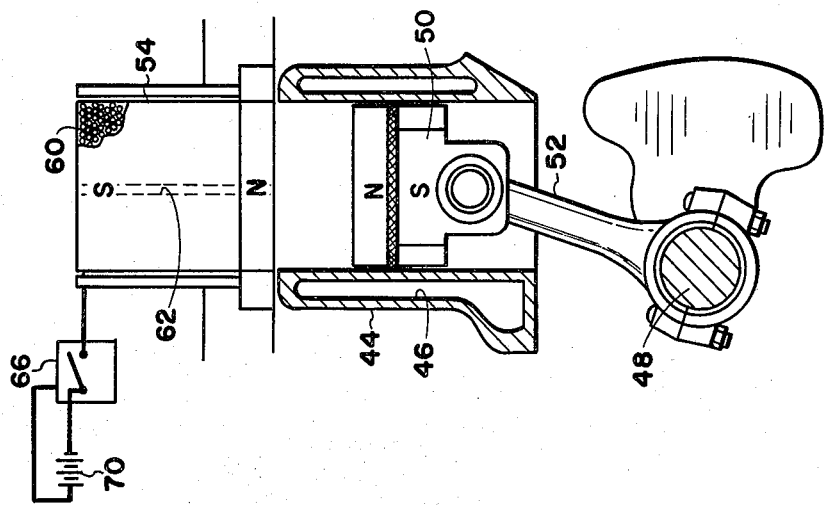

The switching mechanism 66 for that particular electro-magnet 54 is closed thereby providing electrical current through the coils 60 therein. The coils 60 are arranged so that when electrical current passes through those coils, an electro-magnetic field is set up in an opposite direction to the electro-magnetic field produced by the permanent magnet of the piston 50. For instance, the diagram in FIGS. 5, 6 and 7 shows the permanent magnet piston 50 having its outer end designated as the north pole with its inner end designated as the south pole. Oppositely, the electro-magnet 54 when energized is provided with its north pole being on the inner side facing the north pole of the permanent magnet piston 50 with its outer end being the south pole.

Therefore, as the coil is energized as shown in FIG. 5 a downward force is applied to the piston due to opposing magnetic fields thereby forcing the piston through a power stroke as shown in FIG. 6 which in turn rotates the crank shaft 48 of the engine. After the piston 50 has completed its power stroke and is on a return stroke as shown in FIG. 7, the switching mechanism 66 is opened thereby killing the electro-magnetic field produced by the electro-magnet 54 to allow the piston to complete its return stroke.

After the piston completes its return stroke and passes top dead center, the switch 66 is again closed to provide a subsequent power stroke.

It is noted at this point that the internal combustion engine provides a power stroke every second time that the piston advances in the cylinder, the intermediate strokes being exhaust strokes. In the present invention, however, every time the piston passes dead center, electrical power may be provided to the electro-magnet 54 producing a power stroke. Stated another way, for each rotation of the crank shaft 48, each piston can experience a power stroke.

Further, it is noted that on the return stroke as shown in FIG. 7, current could be passed through the coils 60 in an opposite direction which would produce a pulling power on the magnetic piston 50 which would cause the return stroke to also be a power stroke. However, it is anticipated that problems may occur in reversing the current through the electro-magnet due to hysteresis in the electro-magnet and further it is anticipated that problems could occur with respect to the piston rod 52 experiencing tension instead of compression during each power stroke.

Figure 8:
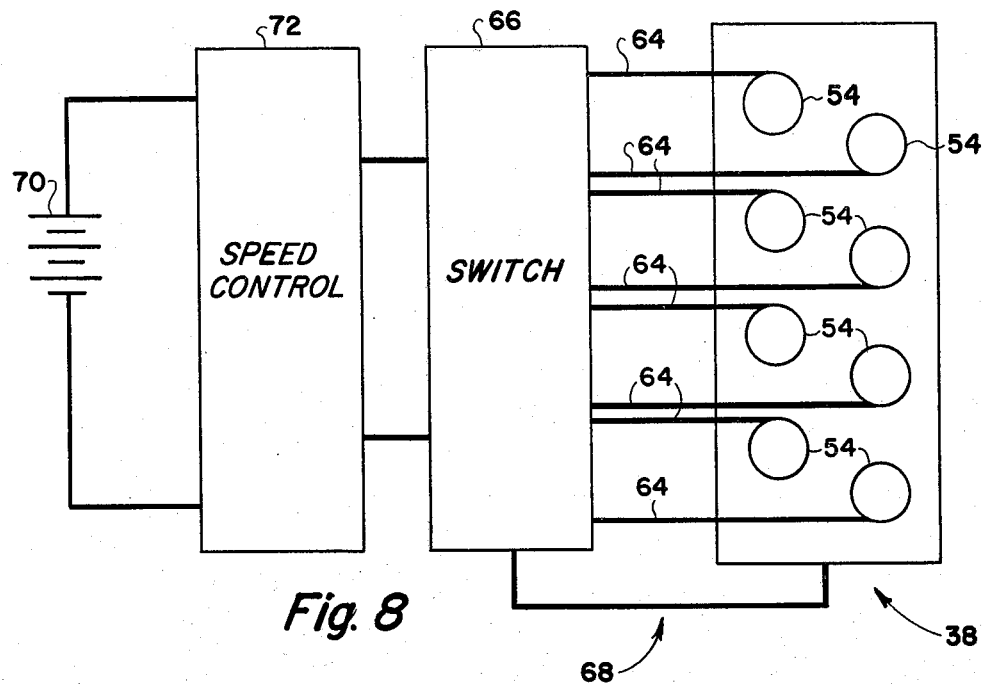
FIG. 8 is a schematic block diagram depicting the electrical power control for the electro-magnetic engine.

The schematic diagram of FIG. 8 depicts the arrangement of the electrical system for operating the engine described in relation to FIG. 2 of the drawings.

Figure 3:
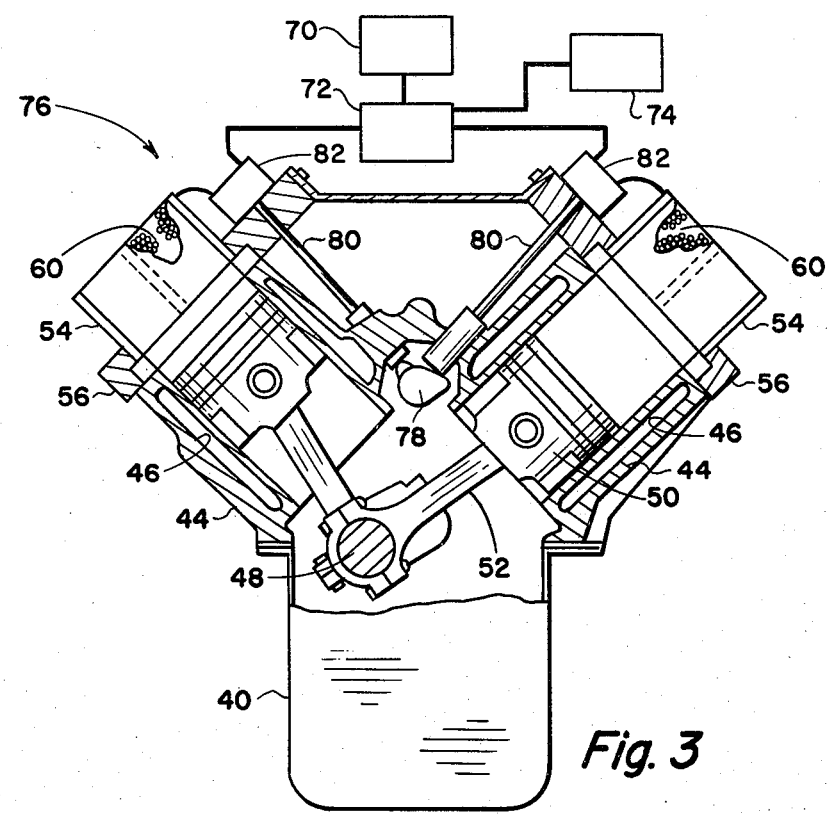
FIG. 3 is an end sectional view of a second embodiment of an electro-magnetic reciprocating engine.

Referring now to FIG. 3, reference character 76 generally indicates an electromagnetic motor which mechanically works from the same general principles of the motor 38 hereinbefore described. Therefore, for purposes of simplicity, common elements of the motor 76 with those of the motor 38 will carry the same reference characters.

In the embodiments of reference character 76, a cam shaft 78 is included and operably connected to the crank shaft 48 in any well known manner (not shown). A plurality of cam rods 80 are operably connected to the cam shaft 78. The outer ends of the cam rods 80 extend through the heads 56 and into switching members 82. The switching members 82 are provided, one for each cylinder and take the place of the switching means 66 of the motor 38. The switching members 82 are operably connected between the electro-magnet 54 and the rheostat or speed control member 72. Like in the first described embodiment, the speed control or rheostat 72 is operably connected to a DC power supply 70 and is controlled by an operator control member 74.

In the electro-magnetic motor 76 shown in FIG. 3, the cam shaft 78 and rod members 80 and switching members 82 serve as the timing mechanism for intermittently applying electrical current to the coil 60 of the electro-magnets 54.

Operation of the engine 76 is then substantially identical to the engine 38 hereinbefore described.

Figure 9:
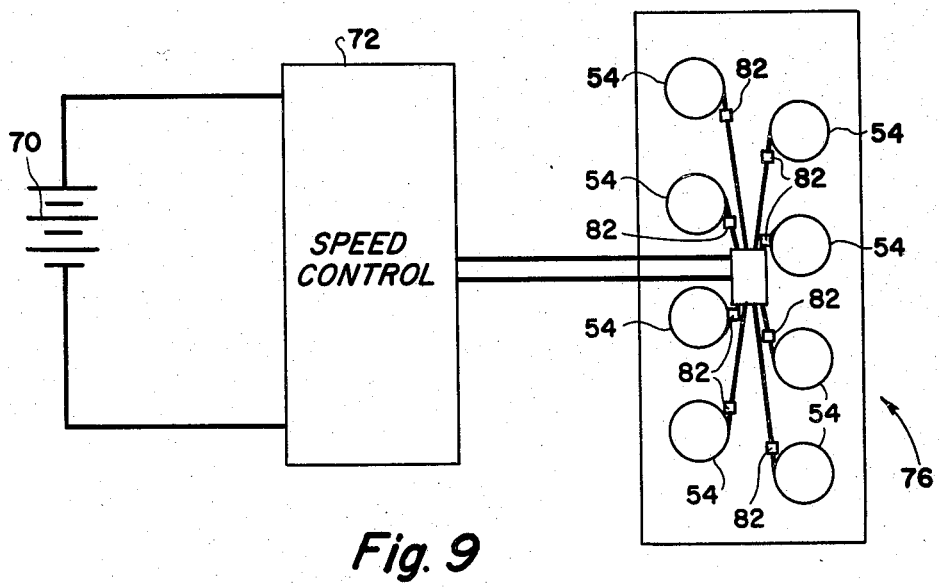
FIG. 9 is a schematic block diagram depicting a second embodiment of the electrical power control for the electro-magnetic engine.

FIG. 9 of the drawings depicts a schematic diagram showing the arrangement of the elements of the engine 76.

Figure 4:
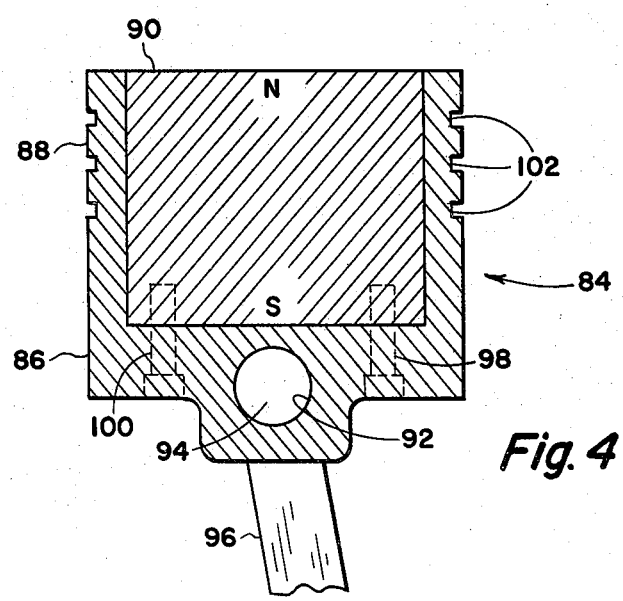
FIG. 4 is a sectional view of a permanent magnet piston.

Referring now to FIG. 4, reference character 84 generally refers to a modification of the permanent magnet piston 50 and comprises a piston body 86 which is constructed of a nonferromagnetic material and is provided with a sleeve section 88 for receiving a permanent magnet 90 therein. The poles, N and S, of the magnet 90 are longitudinally aligned with the center line axis of the sleeve member 88. A transverse bore 92 is provided in the body member spaced from the magnet 90 for receiving a suitable wrist pin 94 therein for pivotally securing one end of the piston rod 96 thereto.

The permanent magnet 90 is held in place within the sleeve portion 88 by bolt members 98 and 100. A plurality of spaced annular grooves 102 are provided around the outer periphery of the sleeve portion 88 for receiving oil rings (not shown) therein.

It should be noted that whereas the drawings and specification herein depict an engine with a Y or V-block configuration, the present invention is suitable for application to any style of internal combustion engine including, but not limited to, in-line cylinders, opposing cylinders, radial engines and even single piston engines.

It is further submitted that an internal combustion engine such as that described by reference character 10 could be modified to convert that engine to an electro-magnetic engine of the type described by reference character 38 by replacing the cylinders with cylinders of nonferromagnetic material, replacing the pistons with permanent magnet pistons, installing electro-magnets at the outer ends of each cylinder, providing an electrical power source and operably connecting a switching apparatus to a timing mechanism and to the electro-magnets and to the power source for intermittently making and breaking the magnetic fields created by the electro-magnets in order to drive the pistons.

From the foregoing it is apparent that the present invention provides an electro-magnetic reciprocating engine which may be produced as a power source for automobiles and the like or which may be produced by modifying existing internal combustion engines.

With the hydrocarbon fuel shortage that is presently upon us, the present invention could provide an alternative to simply having to scrap existing automobiles due to the hydrocarbon fuel shortage.

Whereas the present invention has been described in particular relation to the drawings attached hereto, other and further modifications apart from those shown or suggested herein may be made within the spirit and scope of the invention.

What is claimed is:

1. An electro-magnetic reciprocating engine comprising:
   (a) an engine block for containing lubricant;
   (b) at least one cylinder carried by the block and having an inner end in communication with the interior of the block and the lubricant;
   (c) a piston reciprocally disposed in each cylinder, a permanent magnet carried by the piston and having poles in longitudinal alignment with the cylinder;
   (d) drive means carried by the block and operably connected to each piston to convert reciprocal motion to rotary motion;
   (e) an electro-magnet disposed at the outer end of each cylinder and substantially closing off said outer end of each cylinder, the axis of said electro-magnet being longitudinally aligned with the cylinder and including a pressure relief port at said outer end of the cylinder in communication with the outer end of the piston reciprocally carried therein;
   (f) an electrical power source; and
   (g) means for selectively intermittently polarizing the electro-magnet for creating a magnetic field about said piston to effect reciprocal movement of said piston within the cylinder.

2. An electro-magnetic reciprocating engine as set forth in claim 1 wherein each cylinder is constructed of a nonferromagnetic material.

3. An electro-magnetic reciprocating engine as set forth in claim 1 wherein the piston comprises a sleeve member of nonferromagnetic material and having said permanent magnet carried within the sleeve member.

4. An electro-magnetic reciprocating engine as set forth in claim 3 wherein the piston sleeve member is provided with oil rings.

5. An electro-magnetic reciprocating engine as set forth in claim 1 wherein the compression relief port comprises a longitudinal passageway through said electro-magnet in communication with the outer end of said cylinder.

6. An electro-magnetic reciprocating engine as set forth in claim 1 wherein the power source comprises one or more electrical batteries.

7. An electro-magnetic reciprocating engine as set forth in claim 1 wherein the means for selectively intermittently polarizing the electro-magnet comprises switching means operably connected to the drive means and operably connected between the electrical power source and the electro-magnets.

8. An electro-magnetic reciprocating engine as set forth in claim 7 and including power control means interposed between the electrical power source and the switching means for varying the amount of power provided intermittently to said electro-magnet.

9. An electro-magnetic reciprocating engine as set forth in claim 1 and including cooling water jackets around each cylinder.

* * * * *